Patented June 5, 1934

1,962,003

UNITED STATES PATENT OFFICE 1,962,003

COMPOSITION OF MATTER

Marc Darrin, Pittsburgh, Pa., assignor to F. N. Burt Company, Limited, Toronto, Ontario, Canada, a corporation of Ontario, Canada No Drawing. Application January 16, 1930, Serial No. 421,313

9 Claims. (Cl. 91—70)

This invention relates to a new and useful composition of matter.

It is an object of this invention to provide a composition of matter which will be strong and capable of being easily manipulated and which will also be impermeable, durable, resistant to decomposition and disintegration, a non-conductor of electricity and which can be made fire-proof if desired.

A more specific object is to provide a process by which porous objects and more particularly wood may be completely saturated with sulphur either before or after fabrication to form an impervious, rigid, resistant material which will be an excellent insulator and will possess other desirable properties.

Other objects of the invention will in part be obvious and will in part appear hereinafter.

The invention accordingly comprises a product possessing the features, properties and the relation of constituents which is exemplified in the following detailed disclosure to which reference may be had for a fuller understanding.

Wood in its natural form possesses many desirable properties being comparatively inexpensive and possessing strength and rigidity but it has such an affinity for moisture and it so readily absorbs other substances that it cannot be relied upon where imperviousness is demanded, as for example in electrical insulators. Moreover, this tendency to absorb moisture may result in the wood eventually weathering or cracking.

Sulphur possesses the property of being impervious and chemically inert but attempts to impregnate wood with sulphur have not been successful because the wood fibers do not readily absorb sulphur probably because the sulphur does not readily wet the surface of the fibers.

Moreover sulphur when cooled from the melting point tends to solidify in monoclinic crystals which are unstable at room temperatures and are gradually converted into the rhombic form with a resultant crystalline shrinkage which leaves the product porous and imperfectly impregnated.

In accordance with this invention it has been discovered that certain substances possess the property of causing sulphur to penetrate deeply into the fibers and to solidify in impervious form so that the wood becomes thoroughly saturated with sulphur and impervious thereafter to the absorption of moisture or other materials. This imparts to the wood a degree of hardness, rigidity, and impermeability which makes it useful in fields where it would otherwise be unsuitable and it gives it a density and coherence which makes it resistant and durable and easy to manipulate or machine. The substances herein referred to which are capable of so altering the properties of sulphur are known as introfiers.

The principle of introfaction is most strongly illustrated by the use of small quantities of introfiers such as naphthalene, diphenyls and chlorodiphenyls in which a very great increase in penetration and impermeability may be produced.

Diphenyls and chlorodiphenyls form excellent introfiers and good results have also been obtained with other substances in which the molecule contains a plurality of cyclic nuclei, as for example the higher diphenyls and chlorodiphenyls and diphenyl methane, benzyl ether, dibenzyl ketone, fluorene, carbazol, naphthalene, naphthols, naphthylamines, tetrahydronaphthalenes, monochloronaphthalenes, dichloronaphthalenes, trichloronaphthalenes, tetrachloronaphthalenes, pentachloronaphthalenes and quinoline.

Substances having more than two cyclic nuclei, for example, anthracene, triphenyl methane and triphenylphosphate, possess the property of introfiers, although they are more difficultly soluble in melted sulphur. Triphenyl phosphate in particular is powerful and while comparatively inexpensive, it produces excellent results.

Particularly good results have been obtained with mixtures of chlorodiphenyls including the two-cyclic diphenyls with higher members of the group. This substance is miscible with sulphur in all proportions and in itself forms an excellent impregnant and serves to render the product fire-proof when used in sufficient quantity. Morover, the mutual solution of sulphur and chlorodiphenyls are tougher and more resistant than when sulphur is used alone and is cheaper, tougher and more satisfactory for many purposes than when chlorodiphenyls are used alone. Complete fire-proofing may be obtained by the employment of 65% of chlorodiphenyls with the sulphur but lesser amounts will produce a corresponding effect in reducing the combustibility.

The chlorinated diphenyls are moreover particularly desirable because of the improvement in mechanical properties, a lack of unpleasant odors, their non-volatility and their strong introfying properties.

Naphthalene is an inexpensive and satisfactory introfier but where used in large proportions it may for many purposes be more desirable to employ halogen derivatives which are less volatile and more incombustible.

These introfying substances and particularly the chorodiphenyls are miscible with a wide variety of dye stuffs and coloring matters and serve as a ready means of introduction of these dyes and coloring matters into the impregnant. A variation in the proportions of the ingredients will enable a wide variety of surface effects and textures to be obtained, as for example certain proportions of sulphur and chlorodiphenyls have waxlike properties.

In many cases the proportions of the ingredients are limited by the mutual solubility. Where sulphur is employed with naphthalene or diphenyls or chlorodiphenyls, the proportions may be varied within wide limits since these substances are mutually soluble in almost all proportions.

The amount of sulphur which can be absorbed into wood fiber is dependent upon the porosity of the wood and the character of communication between the pores. With certain woods the absorption will be only a small fraction of that which can be obtained with other woods, but in any event the use of the introfier in a wood having communicating pores makes it possible to carry this impregnation to the saturation point to render the product impervious however porous or dense the working material may have been. Particularly good results have been obtained with coniferous woods such as yellow pine, Douglas fir and cypress, and with deciduous woods such as poplar, birch, beech, bass, red oak, chestnut, gum and maple, possibly by reason of the capacity of these introfiers to mix with the resins, the presence of resinous materials in the wood will in many cases be found not to interfere with the process of impregnation and it may in some cases be beneficial.

The article to be impregnated may be immersed in the melted bath of the ingredients chosen, as for example a solution of 20% of chlorodiphenyls and 80% sulphur at from 100 to 150 degrees C. It is desirable that the duration of impregnation be reduced to a minimum and on this account it may be desirable particularly where the wood or other substance to be impregnated is of a dense character to employ pressure upon the bath during the period of impregnation. In this manner the impregnation may in many instances be hastened.

For some purposes the impregnating bath may be applied with a brush at the surface only. In such case it should be applied sufficiently hot to insure that it may soak into the surface the amount desired or else it should be heated subsequent to its application to permit the desired degree of penetration to be secured.

The temperature of impregnation will of course vary with the composition used for impregnating and will depend also on the porous substance employed.

It has been found that this composition of matter possesses very superior properties as an insulator particularly for high frequency currents and when employed in that capacity it is subject to less electrical losses than where glass insulators are employed.

Since certain modifications in the composition which embodies the invention may be made without departing from the scope it is intended that all matter contained in the above description shall be interpreted as illustrative and not in a limiting sense.

It is also to be understood that the following claims are intended to cover all of the generic and specific features of the invention herein described and all statements of the scope of the invention which as a matter of language might be said to fall therebetween.

Now having described my invention, what I claim as new and desire to secure by Letters Patent, is:—

1. A composition of matter comprising a porous material having its pores substantially filled with a mixture of sulphur and chlorodiphenyls in a stable impervious form and possessing the properties of hardness, strength, impermeability, being an electrical insulator and capable of fabrication.

2. A composition of matter comprising a porous material having its pores substantially filled with a mixture of sulphur and chlorodiphenyls in a stable impervious form including higher members of the chlorodiphenyl series in sufficient quantities to render the product nonflammable and possessing the properties of hardness, strength, impermeability, being an electrical insulator and capable of fabrication.

3. A process of treating wood which comprises subjecting it to the action of sulphur and chlorodiphenyls at a temperature below the temperature of the deterioration of the wood.

4. A process of treating a porous substance which comprises subjecting it to the action of sulphur and chlorodiphenyls.

5. A process of treating a porous substance which comprises subjecting it to the action of sulphur and chlorodiphenyls at a temperature of about 100 to 150 degrees C.

6. A process of treating wood which comprises subjecting it to the action of sulphur and a mixture of chlorodiphenyls comprising a proportion of higher chlorodiphenyls.

7. A process of treating wood which comprises subjecting it to the action of sulphur and a mixture of chlorodiphenyls comprising a proportion of higher chlorodiphenyls at a temperature of about 100 to 150 degrees C.

8. A composition of matter comprising a material with communicating pores having its pores substantially filled with a mixture of an impregnant and chlorodiphenyls, and possessing the properties of strength and impermeability, and being an electrical insulator.

9. A composition of matter comprising wood having its pores substantially filled with a mixture containing chlorodiphenyls and possessing the property of impermeability and being an electrical insulator.

MARC DARRIN.